Dec. 8, 1953  E. W. PASTORIUS  2,661,900
MILEAGE CALCULATOR
Filed Aug. 15, 1951  2 Sheets-Sheet 1
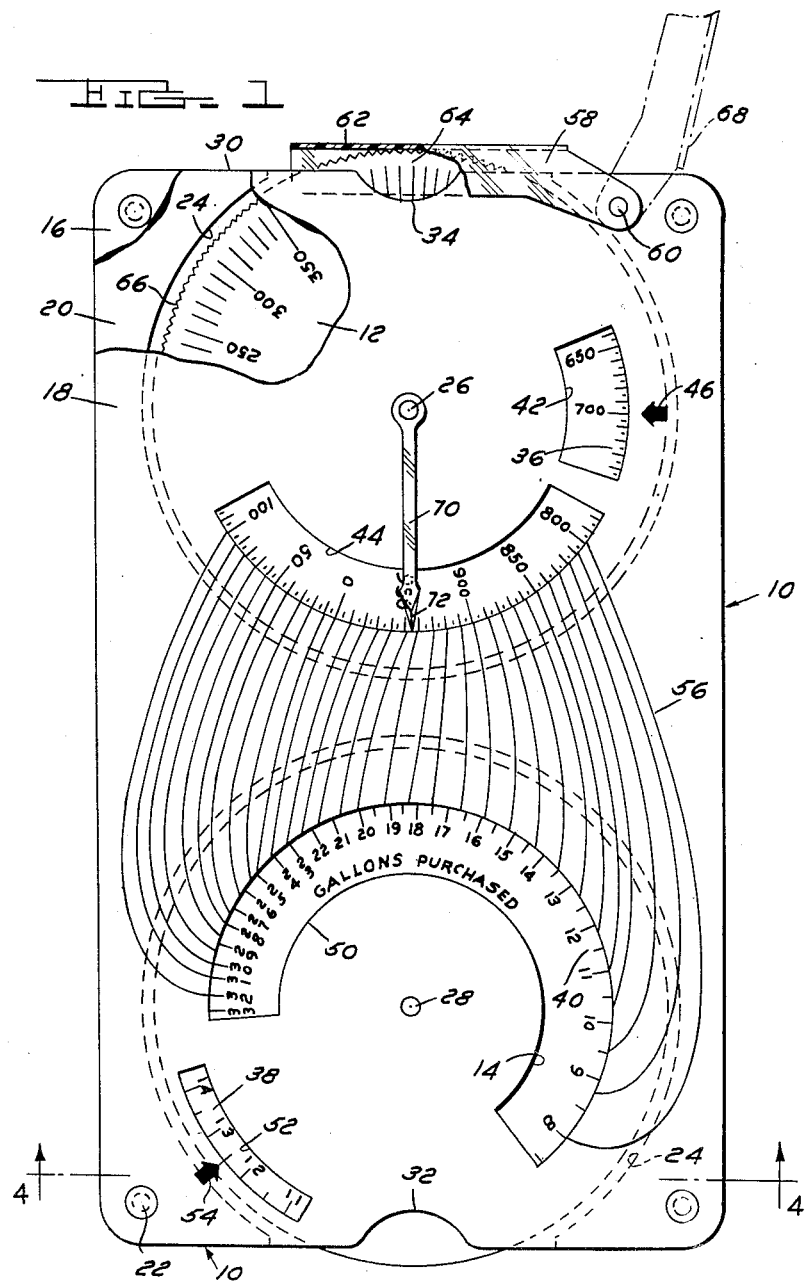
INVENTOR.
ERNEST W. PASTORIUS
BY
Barnes, Kisselle, Laughlin & Raisch
ATTORNEYS Dec. 8, 1953  E. W. PASTORIUS  2,661,900
MILEAGE CALCULATOR
Filed Aug. 15, 1951  2 Sheets-Sheet 2
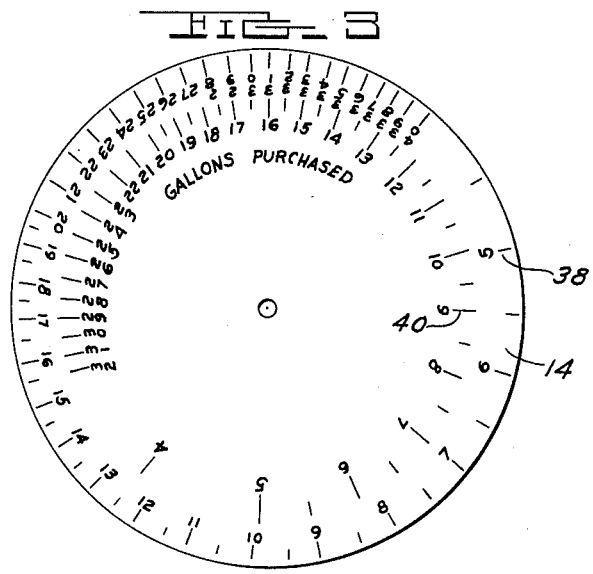
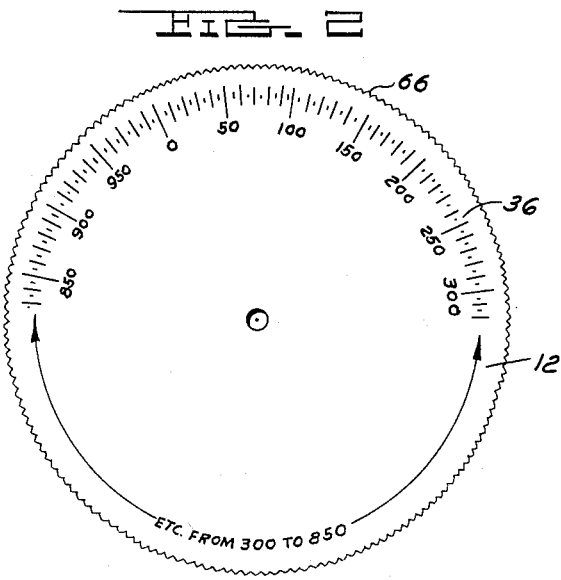
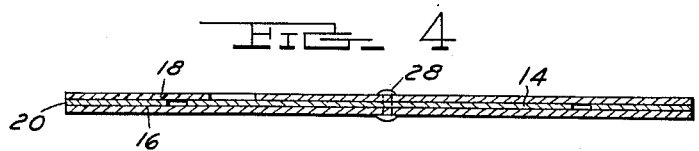
INVENTOR.
ERNEST W. PASTORIUS
BY
Barnes, Kisselle, Laughlin & Raisch
ATTORNEYS Patented Dec. 8, 1953

2,661,900

UNITED STATES PATENT OFFICE 2,661,900

MILEAGE CALCULATOR

Ernest W. Pastorius, Windsor, Ontario, Canada

Application August 15, 1951, Serial No. 241,937

5 Claims. (Cl. 235—74)

This invention relates to a calculating device and more particularly to a device which enables the operator of a vehicle to determine the distance traveled per unit of fuel the vehicle consumes for a given amount of fuel.

It is an object of this invention to provide a device of the type described in which the mileage per gallon of fuel may be calculated entirely by manipulating the device. More specifically, the invention contemplates an inexpensive device which does not require any addition, subtraction or division on the part of the user to determine the mileage per gallon of fuel consumed by the vehicle. The device is constructed so that an initial mileage reading may be indicated on the device and this reading retained on the device until a later date when the mileage indicator of the vehicle shows a different reading. Then, by noting on the device the subsequent mileage reading and by manipulating the device so that the subsequent mileage reading corresponds with the number of gallons of fuel consumed during the interval between the two mileage readings, the number of miles per gallon will be automatically indicated by the device.

I am aware that other devices, such as that illustrated in United States Patent No. 2,489,030, have been proposed for calculating the mileage per gallon of fuel, but with these other devices it is necessary for the user to perform certain arithmetical computations independently of the device in order to use the calculating device. In the above mentioned patent, for instance, the user must first subtract the initial mileage reading from the final mileage reading before using the device. The device of my invention performs all the preliminary calculations and at the same time preserves mileage readings so that they do not have to be written down for use at a later date when the vehicle fuel tank is refilled.

In the drawings:

Fig. 1 is a plan view of the mileage calculator of this invention, parts being broken away to better show the construction thereof.

Fig. 2 shows one of the dials of the device.

Fig. 3 shows the other dial of the device.

Fig. 4 is a sectional view taken along the lines 4—4 in Fig. 1.

The calculating device generally comprises a generally rectangular supporting panel 10 and two dials or circular discs referenced 12 and 14. Supporting panel 10 includes a back member 16, a front member 18 and a spacing member 20 positioned between members 16 and 18 (see Fig. 4). These members are held in assembled relation by rivets 22 or the like at the four corners of the device. Back member 16 is in the form of a continuous sheet of material whereas the intermediate spacer member 20 has circular openings 24 formed therein for accommodating circular discs 12 and 14. Front member 18 is provided with a plurality of window openings described more fully hereinafter. The arrangement is such that the discs 12 and 14 are sandwiched between front member 18 and back member 16.

Disc 12 is pivotally supported on panel 10 by a rivet 26, and disc 14 is pivotally supported on panel 10 by a rivet 28. Discs 12 and 14 are arranged on panel 10 such that a portion of disc 12 extends outwardly beyond the upper edge 30 of panel 10, and disc 14 extends outwardly beyond the lower edge of panel 10. Members 16 and 18 have recessed portions 32 and 34 adjacent their lower and upper edges, respectively, such as to expose a sufficient portion of discs 12 and 14 to enable rotating these discs manually about their respective center pivots.

Referring now particularly to Fig. 2, it will be observed that disc 12 is provided with a scale 36 around the periphery thereof. Scale 36 is divided into spaced units, preferably 100 in number, each unit representing ten miles, so that the circular extent of this scale may be employed for indicating any mileage reading up to 1,000. Each unit may be further subdivided, if desired, to indicate an even smaller minimum number of miles. Disc 14 (see Fig. 3) is provided with an outer scale 38 and an inner concentric scale 40. The units of these two scales are spaced apart corresponding to a logarithmic progression. The units on the outer scale are shown numbered consecutively from 5 to 40, the numeral 4 (not shown) corresponds in position with the numeral 40. The units of the inner scale 40 are numbered consecutively from 4 to 32. Inner scale 40 serves to indicate the units (gallons) of fuel consumed or purchased while the outer scale 38 serves to indicate the number of miles per unit of fuel consumed or purchased. It will be observed that scales 38 and 40 are in reverse ratio relative to one another. The numerical values on scale 38 increase in a clockwise direction while the numerical values on scale 40 increase in a counter-clockwise direction. These two scales are circumferentially related in position in a manner more fully described hereinafter. It should be noted that, although reference is made herein to "gallons" and "miles," other units of measure may be employed; and whenever these terms appear in the claims, they are used merely in a descriptive sense.

Front member 18 is fashioned with two circular openings or windows 42 and 44. These windows are concentric with rivet 26. There is associated with window 42 an indicating arrow 46. Arrow 46 is preferably printed, stamped or otherwise permanently affixed to front member 18. Window 44, as is illustrated in Fig. 1, is spaced circumferentially of window 42 and has a circumferential extent such that a range of about 400 miles is exposed on scale 36 of disc 12. Front member 18 also has another pair of circular openings or windows 50 and 52 overlying disc 14. Window 50 exposes a large portion of scale 40 while window 52 is spaced radially outwardly of window 50 and exposes a portion of scale 38. Window 52 has a fixed indicating arrow 54 associated therewith.

In order to associate a particular reading on the portion of scale 36 visible through window 44 with a value of the number of units of fuel purchased or consumed on scale 40 and visible through window 50, front member 18 has incorporated thereon a plurality of "follow-through" or lead lines 56 which extend from the outer periphery of window 44 to the outer periphery of window 50. At the periphery of window 44 the lines 56 are spaced equally apart to correspond with the spacing of the units shown on scale 36. At the periphery of window 50 these lines are spaced apart in a logarithmic progression corresponding to the mileage reading between arrow 46 and the particular reading of the lead line on scale 36. The purpose of these lead lines 56 is to enable the user to follow through a reading on scale 36 to a reading on scale 40. These lead lines actually perform the operation of subtracting the initial mileage reading from the subsequent mileage reading so that the actual number of miles traveled in effect is indicated around the periphery of window 50. The logarithmic spacing of these lead lines at the window 50 is such that when the numeral 10 on scale 40 is aligned with the lead line designating 100 miles of travel, the unit spacings on scale 40 register with the lead line spacing at window 50.

As mentioned previously, scale 40 serves to indicate the number of units which, for illustrative purposes, may be considered as gallons of fuel purchased while the scale 38 is indicative of the miles traveled by the vehicle per gallon of fuel purchased or consumed. Indicating arrow 54 is located on front panel 18 and scales 38 and 40 are circumferentially related to one another such that, when disc 12 is rotated to a position wherein arrow 46 indicates the previous full tank mileage reading and disc 14 is rotated to align the numerical value of the gallons of fuel purchased to refill the fuel tank with the particular indicating line 56 which corresponds with the subsequent mileage reading, this mileage reading being visible on scale 36 through window 44, the actual number of miles traveled by the vehicle per gallon of fuel is indicated on scale 38 by pointer 54.

If desired, a latch member 58 may be pivoted on supporting panel 10 as at 60 for locking disc 12 at a particular setting. Latch 58 has a U-shaped portion 62 which is arranged to frictionally engage the outer faces of members 16 and 18 and the exposed edge portion 64 of disc 12 in order to maintain the disc 12 in a fixed position of adjustment during the interval of time that elapses between successive purchases of fuel. The peripheral edge of disc 12 may be serrated as at 66 to enhance the holding qualities of latch 58. Latch 58 is arranged to be pivoted from a position locking with disc 12, illustrated in solid lines in Fig. 1, to a position free of engagement with disc 12, illustrated by broken lines 68. In addition, the device may be further provided with a movable pointer 70 pivotally retained on the face of member 18 as by rivet 26. Pointer 70 is preferably formed of a transparent material having a small opaque indicating portion 72 at one end thereof which is adapted to register with the readings on scale 36. Pointer 70 is engaged by rivet 26 with sufficient friction to hold the pointer in the position in which it is set unless it is manually shifted to a different position.

The operation of the device is as follows: The motorist fills the vehicle tank with fuel and notes on the vehicle mileage indicator the mileage reading. Let us assume for the purpose of description that the mileage indicator reads 700. He then turns disc 12 so that the reading 700 thereon is aligned with indicating arrow 46. The calculating device is thus set for a subsequent mileage calculation. The next time the motorist fills the vehicle tank with fuel he again notes the mileage reading on the mileage indicator of the vehicle and shifts pointer 70 around scale 36 to indicate this reading. Let us assume that this second mileage reading is 950 as illustrated. He then follows the indicating line 56 aligned with the numeral 950 on scale 36 down to window 50. Disc 14 is then rotated so that the number of gallons of fuel purchased which is represented on scale 40 is aligned with the indicating line 56 leading from the value 950 on scale 36. In the position indicated in the drawings, it is assumed that 20 gallons of fuel were purchased. The motorist then reads the mileage per gallon directly from the value on scale 38 indicated by pointer 54. With the numerical values thus assumed for the various readings, it will be noted that indicating arrow 54 shows that, between the two successive purchases of fuel, the vehicle averaged 12½ miles per gallon of fuel.

After the motorist has manipulated the device to determine the mileage per gallon, he then rotates disc 12 so that the last mileage reading (950) on scale 36 is aligned with arrow 46, and the device is thus set for a subsequent calculation the next time the motorist purchases fuel. Latch 58 is, of course, maintained in the locked position except when disc 12 is being manipulated to insure against accidental rotation of disc 12 between successive calculations. Thus, the mileage reading is preserved on the device by arrow 46 and need not be written down.

Pointer 70, in addition to its function of clearly indicating which of the lead lines 56 is to be followed to window 50, also serves another purpose. If the operator should forget to rotate disc 12 so that the new mileage reading is aligned with indicating arrow 46, it will be appreciated that this reading will be preserved by pointer 70. When the operator fills his tank with gas the next time, he can, by comparing the reading on the mileage indicator of the vehicle with the reading at arrow 46, determine whether disc 12 was rotated to the new mileage reading at the time the tank was previously filled. If, by comparing these two readings, he realizes that disc 12 was not set to the new reading, he can ascertain what this reading should have been by noting the value on scale 36 indicated by pointer 70. He can then rotate dial 12 to the proper initial reading 70 and thereafter manipulate the device as previously described to determine the mileage per gallon between the two successive fillings of the fuel tank.

Thus, it will be seen that I have provided a very useful and easily manipulable device for quite accurately calculating the mileage per gallon of fuel without requiring any mental arithmetical process on the part of the user. It will be appreciated, of course, that the device can be very inexpensively constructed out of pasteboard and the like so that it may be sold at an attractive price or even distributed as an advertising novelty by large fuel companies.

I claim:

1. A fuel mileage calculator comprising a supporting member and two circular discs pivotally supported by means of spaced apart pivots on the face of said supporting member, one of said discs having thereon a circular scale of equally spaced units indicative of mileage readings, the other disc having two separate circular scales arranged concentrically thereon, said last two mentioned scales being logarithmically calibrated but being in reverse ratio relative to one another, one of said last two mentioned scales being indicative of the total fuel consumed and the other scale being indicative of the distance traveled per unit of fuel consumed, said supporting member having a fixed indicator thereon associated with the scale on the first mentioned disc, said supporting member having a plurality of spaced lead lines thereon extending from around the periphery of the first scale to the periphery of the scale indicative of fuel consumption so that, when the two discs are rotated to desired positions, a mileage value on the first scale may be visibly associated with a value of the number of units of fuel consumed on the fuel consumption scale, and a second fixed indicator on said supporting member associated with the scale on the second disc indicative of the distance traveled per unit of fuel consumed, said two scales on said second disc being positioned circumferentially relative to one another such that, when the first disc is rotated to a position wherein said first indicator designates a given initial mileage reading and the second disc is positioned to align the value of the particular number of units of fuel consumed with the associating means aligned with the value on the first scale corresponding to the subsequent mileage reading, said second indicator designates on its associated scale on the second disc the distance traveled per unit of fuel consumed.

2. The combination set forth in claim 1 wherein said lead lines are spaced apart around the periphery of said first scale corresponding to the spacing of the units on said first scale and wherein the spacing of said lead lines around the periphery of said fuel consumption scale is logarithmically calibrated.

3. The combination set forth in claim 1 wherein said lead lines are spaced apart around the periphery of said first scale to correspond with the spacing of the units on said first scale, the spacing of said lead lines around the periphery of said fuel consumption scale being logarithmically calibrated to correspond with the difference in mileage readings between said first mentioned fixed indicator and each of said lead lines at the periphery of said first mentioned scale.

4. A fuel mileage calculator comprising a support member, first and second circular disc members pivotally supported on the face of said support member by means of spaced apart pivots, said first disc member having thereon a circular scale of equally spaced units indicative of mileage readings, said support member having a fixed indicator thereon associated with said mileage scale, said second disc member having a logarithmically calibrated circular scale thereon indicative of the total fuel consumed, one of said first and third mentioned members having a circular scale thereon indicative of the distance traveled per unit of fuel consumed, said last mentioned circular scale being concentric with the fuel consumption scale and also being logarithmically calibrated, the other of said first and third mentioned members having a fixed indicator thereon associated with said third mentioned circular scale, a plurality of indicia means on said support spaced around the periphery of said first disc member, and a plurality of indicia means spaced around the periphery of said second disc member, said sets of indicia means corresponding with one another such as to enable the association of a mileage value on the mileage scale with a value of the number of units of fuel consumed on the fuel consumption scale, said two logarithmically calibrated scales and said last mentioned fixed indicator being positioned circumferentially relative to one another such that when the first disc member is rotated to a position wherein the first mentioned indicator designates an initial mileage reading on the mileage scale and the second disc member is positioned to align the value of the particular number of units of fuel consumed with the corresponding indicia means associated with the reading on the mileage scale corresponding to the subsequent mileage reading, said second indicator designates on its associated scale the distance traveled per unit of fuel consumed.

5. A fuel mileage calculator as set forth in claim 4 wherein the indicia means around the periphery of said first disc member are spaced apart circumferentially corresponding to the spacing of the units on the mileage scale of the first disc member and wherein the corresponding indicia means around the periphery of the second disc member are spaced apart logarithmically to correspond with the difference in mileage readings between the first mentioned fixed indicator and each of the indicia means around the periphery of the first disc member.

ERNEST W. PASTORIUS.

References Cited in the file of this patent

UNITED STATES PATENTS

| Number | Name | Date |
|---|---|---|
| 680,018 | Brake | Aug. 6, 1901 |
| 753,840 | Barth et al. | Mar. 8, 1904 |
| 1,460,148 | Tillyer | June 26, 1923 |
| 2,489,030 | Herrick | Nov. 22, 1949 |

FOREIGN PATENTS

| Number | Country | Date |
|---|---|---|
| 6,278 | Great Britain | Mar. 20, 1908 |